(12) United States Patent
Germanovich et al.

(10) Patent No.: US 8,953,727 B2
(45) Date of Patent: Feb. 10, 2015

(54) METHOD OF DETECTION OF SIGNAL IN COMMUNICATION SYSTEMS WITH MIMO CHANNEL

(71) Applicant: Samsung Electronics Co. Ltd., Suwon-si, Gyeonggi-do (KR)

(72) Inventors: Bakulin Mihail Germanovich, Moscow (RU); Rog Andrey Leonidovich, Moscow (RU); Chernysh Alexander Victorovich, Moscow (RU); Kreyndelin Vitaliy Borisovich, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 13/737,222

(22) Filed: Jan. 9, 2013

(65) Prior Publication Data

US 2013/0177114 A1    Jul. 11, 2013

(30) Foreign Application Priority Data

Jan. 10, 2012    (RU) .................................. 2012100030

(51) Int. Cl.
*H04B 7/10* (2006.01)
*H04L 25/02* (2006.01)
*H04L 25/03* (2006.01)
*H04B 7/08* (2006.01)

(52) U.S. Cl.
CPC ...... *H04L 25/0256* (2013.01); *H04L 25/03184* (2013.01); *H04L 25/0321* (2013.01); *H04L 25/03891* (2013.01); *H04B 7/0854* (2013.01)
USPC ........... 375/347; 375/260; 375/267; 375/295; 375/316; 375/340

(58) Field of Classification Search
CPC ........... H04L 2025/03414; H04L 2025/03426; H04L 25/03331; H04L 25/03171; H04L 1/0052; H04L 1/0054; H04L 1/06; H04L 25/03159; H04L 25/03292; H04L 25/06; H04L 1/0045; H04L 25/0232; H04L 25/03012
USPC ......... 375/260, 261, 262, 265, 267, 270, 272, 375/289, 295, 299, 306, 316, 322, 340–342, 375/345, 347
See application file for complete search history.

(56) References Cited

U.S. PATENT DOCUMENTS

| 8,159,954 | B2 * | 4/2012 | Larsson et al. ................. 370/238 |
| 8,320,510 | B2 * | 11/2012 | Kim et al. ..................... 375/347 |
| 8,462,899 | B2 * | 6/2013 | Wang et al. ................... 375/346 |
| 8,559,543 | B1 * | 10/2013 | Lee et al. ...................... 375/267 |
| 8,711,987 | B2 * | 4/2014 | Sahlin et al. .................. 375/341 |
| 2004/0161059 | A1 * | 8/2004 | Andrieu ........................ 375/341 |
| 2005/0175131 | A1 * | 8/2005 | Kansanen et al. ............. 375/350 |
| 2007/0291882 | A1 | 12/2007 | Park et al. |

(Continued)

FOREIGN PATENT DOCUMENTS

RU    2297731 C1    4/2007

*Primary Examiner* — Hirdepal Singh
(74) *Attorney, Agent, or Firm* — Jefferson IP Law, LLP (57) ABSTRACT

An apparatus and a method for detecting signals are provided. The method for detecting signals in a receiving end having a plurality of antenna in wireless communication system includes performing Minimum Mean Square Error (MMSE) estimation for a transmitted symbol vector, determining a covariance matrix for the MMSE estimation, determining a triangular matrix based on the covariance matrix, and determining accumulated metrics for each symbol vector candidate based on the triangular matrix.

20 Claims, 4 Drawing Sheets

(56) References Cited

U.S. PATENT DOCUMENTS

| | | | |
|---|---|---|---|
| 2008/0095281 A1* | 4/2008 | Hosur et al. | 375/347 |
| 2008/0298478 A1 | 12/2008 | Kim et al. | |
| 2008/0317172 A1* | 12/2008 | Zhang et al. | 375/340 |
| 2009/0213965 A1 | 8/2009 | Maeda et al. | |
| 2009/0257477 A1* | 10/2009 | Khayrallah et al. | 375/148 |
| 2010/0157785 A1 | 6/2010 | Song et al. | |
| 2011/0142181 A1* | 6/2011 | Leshem et al. | 375/341 |
| 2012/0033683 A1* | 2/2012 | Sahlin et al. | 370/480 |
| 2012/0051467 A1* | 3/2012 | Wang et al. | 375/340 |

* cited by examiner

METHOD OF DETECTION OF SIGNAL IN COMMUNICATION SYSTEMS WITH MIMO CHANNEL

PRIORITY

This application claims the benefit under 35 U.S.C. §119 (a) of a Russian patent application filed on Jan. 10, 2012 in the Russian Patents and Trademark Office and assigned Serial No. RU 2012100030, the entire disclosure of which is hereby incorporated by reference.

BACKGROUND OF THE INVENTION

1. Field of the Invention

The present invention relates to communications technologies. More particularly, the present invention relates to wireless communication systems and to methods of signal receiving in a transmission system using a multi-antenna receiving/transmission technology.

2. Description of the Related Art

Multi-antenna receiving/transmission systems, hereinafter referred to as Multiple-In/Multiple-Out (MIMO) system are relatively new technologies in the field of wireless communication systems. Such systems use multiple transmitting and receiving antennas for a signal parallel transmission by several spatially diverse channels in the same range of a spectrum and show high spectral efficiency The MIMO system in the frequency field is usually described by the matrix of Equation 1:

$$Y = HX + \eta \quad (1)$$

In Equation 1, Y denotes an N-dimensional vector of complex values of received signal, X denotes an M-dimensional vector of transmitted complex signal, $\eta$ denotes vectors of samples of complex noise with dimension N×1 with zero average and dispersion $2\sigma_\eta^2$, and H denotes complex channel matrix of the size N×M, consisting of complex transmission coefficients of all spatial subchannels.

Each component $x_i$ of the vector X may possess one of $2^K$ complex values depending on the applied scheme of modulation. Each component contains information about K transmitted bits, i.e. $x_i(b_{1,i} \ldots b_{K,i})$, where $b_{k,i} \in \{0,1\}$. As a whole vector X contains information about K*M bits, i.e. X=X(B), where B⊢ [b$^{(1)}$ ... b$^{(KM)}$].

According to algorithm of the maximum plausibility (MP), the function of plausibility (likelihood) of vector X may be calculated according to Equation 2:

$$\Lambda(X) = C \exp\left(-\frac{1}{2\sigma_\eta^2}(Y - HX)^H(Y - HX)\right) \quad (2)$$

Thus the algorithm of MP allows determining the ratio of plausibility for each bit according to Equation 3:

$$LLR_i = \log \left( \frac{\sum_{\substack{B \\ b_i=1}} \exp\left(-\frac{1}{2\sigma_\eta^2}(Y - HX(B))^H(Y - HX(B))\right)}{\sum_{\substack{B \\ b_i=0}} \exp\left(-\frac{1}{2\sigma_\eta^2}(Y - HX(B))^H(Y - HX(B))\right)} \right) \quad (3)$$

The summation in Equation 3 is performed by all possible values B, which may be rather high. Thus, complexity of algorithm MP can be excessively large for high rank of matrix H and modulation with the large alphabet. It is necessary to consider all possible variants of values X, which is difficult to realize in case of a considerable number of antennas and multiposition modulation (modulation with the large alphabet). So for 4 transmit antennas (4 parallel information flows) and modulation QAM-16 in the receiver it is necessary to analyze 65536 possible variants of the vector X.

There are a number of methods to achieve operating characteristics close to characteristics of algorithm MP, and, at the same time, to maintain complexity of realization at a level acceptable for practical systems. One such method is an algorithm K-best which relates to quasioptimum algorithms and allows reaching an acceptable compromise between complexity of realization and operating characteristics.

Various approaches to addressing issues appearing at practical realization of telecommunication systems, based on MIMO technology are discussed in the related art. Some of the approaches are described in the references below.

[1]—Scalable VLSI architecture for K-best Breadth-First Decoding, U.S. Pat. No. 7,889,807 B2, Feb. 15, 2011.

[2]—Adaptive selection of survival symbol replica candidates based on Maximum reliability in QRM-MLD for OFCDM MIMO multiplexing. K. Higuchi et al./IEEE Communication Society Globecom 2004. Pp. 2480-2486.

[3]—MIMO multiplexing Communication system and a signal separation method, U.S. Pat. No. 7,864,897 B2, Jan. 4, 2011.

[4]—Spherical decoder for wireless communications, U.S. Pat. No. 7,822,150 B2, Oct. 26, 2010.

[5]—Apparatus and method for detecting signals in multi-input multi-output system, Patent Application No.: US 2007/0291882 A1, Dec. 20, 2007.

[6]—Near ML Decoding method based on metric-first search and branch length threshold, Patent Application No.: US 2010/0157785 A1, Jun. 24, 2010.

[7]—3GPP TR 36.803v1.1.0 (2008-04). 3rd Generation Partnership Project; Technical Specification Group Radio Access Network; Evolved Universal Terrestrial Radio Access (E-UTRA); User Equipment (UE) radio transmission and reception; (Release 8).

The references will be referred to herein with the appropriate reference number.

In particular, in [1] a method of MIMO detection based on QR decomposition of the matrix of channel H is presented. The QR decomposition may be represented as Equation 4.

$$H = QR \quad (4)$$

A search of symbols-candidates in width is applied. The given approach is also used in [2], and mentioned as traditional algorithm K-best.

The specified algorithm is a variant of the spherical decoder with "Breadth-first search" for which plausibility function is determined for the limited number (K) candidates located in a vicinity of a point with the maximum value of function of plausibility $\Lambda(x)$. The same problem can be solved by means of the traditional spherical decoder with "Depth-first search" in [4], [5], and [6].

QR decomposition (4) is necessary for effective realization of these search procedures. Here R denotes the upper triangular matrix and Q denotes the unitary matrix. By means of QR decomposition the channel matrix will be converted to the upper triangular form, and elements of a noise vector, in turn, remain not correlated. Initial variants of these search methods of search, as well as their modifications, use QR module of decomposition as the main component.

Multiplication of both parts (1) on $Q^H$ does not change statistical distribution of noise component in a vector of the received signal. Thus, by means of QR decomposition (1) may be converted to Equation 5:

$$Z = \begin{bmatrix} z_1 \\ \vdots \\ z_{M-1} \\ z_M \end{bmatrix} = \qquad (5)$$

$$Q^H Y = RX + v = \begin{bmatrix} r_{11}x_1 + \ldots + r_{(1)(M-1)}x_{M-1} + r_{(1)M}x_M + v_1 \\ \vdots \\ r_{(M-1)(M-1)}x_{M-1} + r_{(M-1)M}x_M + v_{M-1} \\ r_{MM}x_M + v_M \end{bmatrix}$$

In Equation 5, $v = Q^H \eta$ denotes the vector consisting from non-correlated noise components (since matrix Q is unitary).

Similarly to Equation 2, the function of plausibility for Equation 5 may be represented as Equation 6:

$$\Lambda(X) = C \exp\left(-\frac{1}{2\sigma_\eta^2}(Z - RX)^H(Z - RX)\right) = \qquad (6)$$

$$\exp\left(-\frac{1}{2\sigma_\eta^2} \sum_{i=1}^{M} \left\| \begin{array}{c} z_i - r_{ii}x_i - r_{i(i+1)}x_{i+1} \ldots - \\ r_{i(M-1)}x_{M-1} - r_{i,M}x_M \end{array} \right\|^2\right)$$

Due to the upper triangular form of matrix R, computation of an exponent index for plausibility function may be performed layerwise, starting from the lower layers in an ascending order according to Equation 7:

$$\sum_{i=1}^{M} \|z_i - r_{ii}x_i - r_{i(i+1)}x_{i+1} \ldots - r_{i(M-1)}x_{M-1} - r_{i,M}x_M\|^2 = \qquad (7)$$

$$\|z_M - r_{MM}x_M\|^2 + \|z_{M-1} - r_{(M-1)(M-1)}x_{M-1} - r_{(M-1),M}x_M\|^2 +$$

$$\ldots \|z_i - r_{ii}x_i - r_{i(i+1)}x_{i+1} \ldots r_{i(M-1)}x_{M-1}r_{i,M}x_M\|^2 +$$

$$\ldots \|z_1 - r_{11}x_1 - r_{12}x_2 \ldots - r_{1,(M-1)}x_{M-1} - r_{1,M}x_M\|^2$$

Search of the symbols-candidates located in a vicinity of a point of the maximum plausibility, is performed step-by-step, starting from M-th layer. As the first summand in the right part of Equation 7 depends only from $x_M$, it is possible to easily determine metrics for all possible values $x_M$ according to Equation 8:

$$d_M = \|z_M - r_{M,M}x_M\|^2 \qquad (8)$$

Figure 2A:
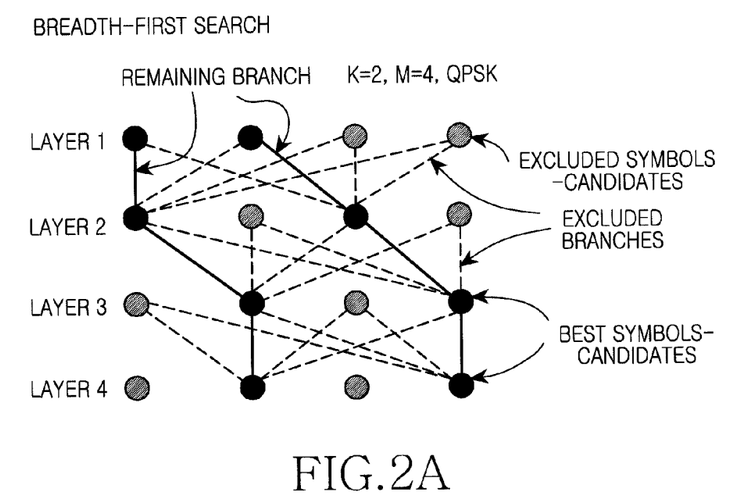
FIGS. 2A and 2B illustrate a Breadth-first search and a Depth-first search in an wireless communication system according to an exemplary embodiment of the present invention.
Figure 2B:
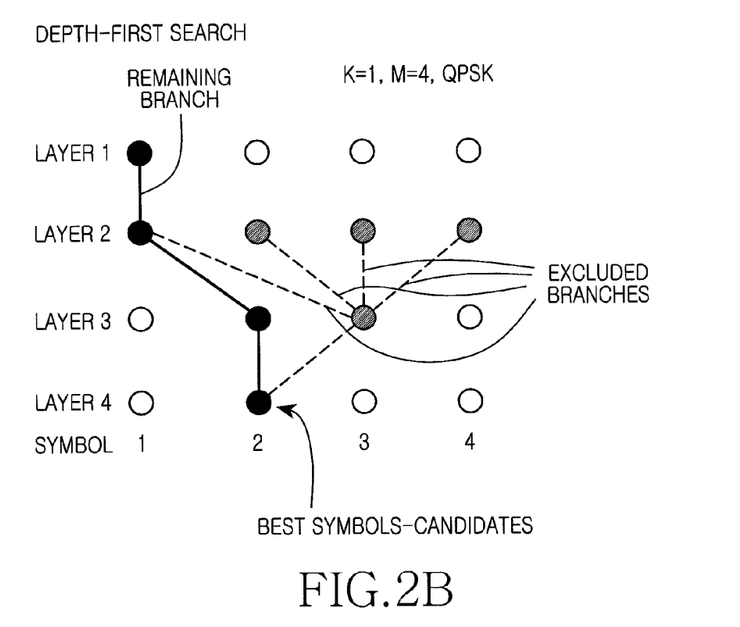

In the aforementioned example, the square of Euclidean of distance is used as the branch metrics. The branch denotes the structure, uniting symbols-candidates in the several serially located layers, originating on a layer M and passing only through one symbol candidate in each of the subsequent seen layers. Examples for the branches are illustrated in FIGS. 2A and 2B.

When performing "Breadth-first search" based on criterion of a minimum of metrics according to Equation 8, it is possible to determine K best candidates $x_{M,best}^{(k)}$ from the whole set of values $x_M$. $x_{M,best}^{(k)}$ denotes best symbol candidate with index k among symbol candidates in layer M. Further search procedures pass to layer M−1. The layer M−1 corresponds to the second summand in the right part in Equation 7. At that, K best remaining candidates from layer M are considered as the solution for the M-th layer. While searching for the best candidates in layer M−1, accumulation of the metrics of a resulting branch is performed, and K best candidates having the minimum metrics is selected from the whole received set of branches. The metrics for a branch, connecting symbols-candidates from M-th and M−1-th layer is determined from Equation 9.

$$d_{M-1} = d_M + \|z_{M-1} - r_{(M-1)(M-1)}x_{M-1} - r_{(M-1),M}x_M\|^2 \qquad (9)$$

In Equation 9, the second summand denotes the part of the metrics received on M−1-th layer, and the first summand denotes component of the metrics of the branch, received on M-th layer according to Equation 8. Thus, accumulation of the metrics of a branch is performed on each step. K best branches with the minimum accumulated metrics are stored in each layer.

The error at an early stage of search leads to essential deviation of K best survived branches at a final stage from a vicinity of the solvation of MP. For a search that has begun with a layer with the maximum energy, that is, the most reliable layer, procedure of sorting of columns of matrix of channel H and corresponding permutation of elements of a vector X is performed before the beginning of search. In this case error influence is minimized at a choice of the survived symbols-candidates on initial steps of algorithm. The specified sorting can be performed in ascending order of norms of columns of matrix H and corresponding permutation of elements in a vector X. A number of alternative methods have been proposed, such as methods discussed in [6]. Application of sorting of columns of a channel matrix enables operating characteristics of traditional algorithm of the K-best to approach operating characteristics of algorithm of MP, thus keeping a number of candidates on essential lower level as compared to an algorithm of MT.

After finishing the search procedure, the decision is made on value of the transmitted vector X (rigid or soft) based on a set of the survived branches (K best branches). For making the rigid decision, elements of the vector X are taken equal to symbols-candidates of a branch with the least accumulated metrics. In case of the soft decision ratios of the logarithm of plausibility are computed according to Equation 3, at that only K remaining branches are considered as X(B).

In "Depth-first search", which is an alternative search method for determining the best combination of symbols-candidates (see FIG. 2B), the following operations are performed: starting from the M layer, the detector serially scans layer after layer, accumulating the metrics of a branch according to Equation 7 and comparing the accumulated metrics to a threshold δ, and determining a radius of hypersphere, in which selection of K best branches is performed. The branch is extended each time when the detector discovers the symbol candidate in i-th layer, satisfying a condition of a presence of the whole branch in the specified hypersphere. On the next step the detector searches an extension of the given branch in i−1 layer. If the branch metrics on i-th layer exceeds a threshold δ, the given branch is rejected (finally or temporarily), as is all of the given branch's extensions, originating in i-th layer. In this case the detector begins searching other branches in a similar manner.

The discussion of sorting of columns and symbol detection with respect to "Breadth-first search" is applicable as well to "Depth-first search".

According to the approach presented above, each i-th detected layer depends only from previous i+1 . . . M layers and does not depend on the subsequent 1 . . . i–1. Thus, erroneous decisions at early stages (in which candidates are selected that are not in the vicinity of the solution to MP), there will be no solution to MP among the remaining branches and K best branches will appear distant from an area of MP decision. The given problem is partly solved due to application of search with return and changing the list of the remaining branches on the previous layers. Such method, as the spherical decoder, possesses changeable complexity and a variable delay that is inconvenient in their practical realization. Thus algorithms K-best with "Breadth-first search" described in [1] and "Depth-first search" described in [4], as well as their modifications described in [2,3,5,6] based on QR decomposition, cannot be considered as the only possible methods of search of the best symbols-candidates.

Therefore, there is a need for providing a scheme to search best symbol candidates.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and an improved method of Multiple Input Multiple Output (MIMO) detection with smaller complexity and better operating characteristics, than the best available analogues.

In accordance with an aspect of the present invention, a method for detecting signals in a receiving end having a plurality of antenna in wireless communication system is provided. The method includes performing Minimum Mean Square Error (MMSE) estimation for a transmitted symbol vector, determining a covariance matrix for the MMSE estimation, determining a triangular matrix based on the covariance matrix, and determining accumulated metrics for each of at least one symbol vector candidates based on the triangular matrix, and detecting symbols transmitted in the signals according to the accumulated metrics.

In accordance with another aspect of the present invention, an apparatus for apparatus for a receiving end having a plurality of antenna in wireless communication system is provided. The apparatus includes the plurality of antennas for receiving signals comprising a transmitted symbol vector from a transmitting end, and a receiver for perform MMSE estimation for the transmitted symbol vector, for determining a covariance matrix for the MMSE estimation, for determining a triangular matrix based on the covariance matrix, and for determining accumulated metrics for each of at least one symbol vector candidate based on the triangular matrix.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention describe a technique to search best symbol candidates. For the purposes of the claimed invention the proposal described in [1], is selected as a prototype. The present invention may be implemented in an electronic device including a portable terminal such as, for example, a smart phone and a mobile telecommunication terminal Hereunder, a portable terminal is used as an example for the electronic device.

Figure 1:
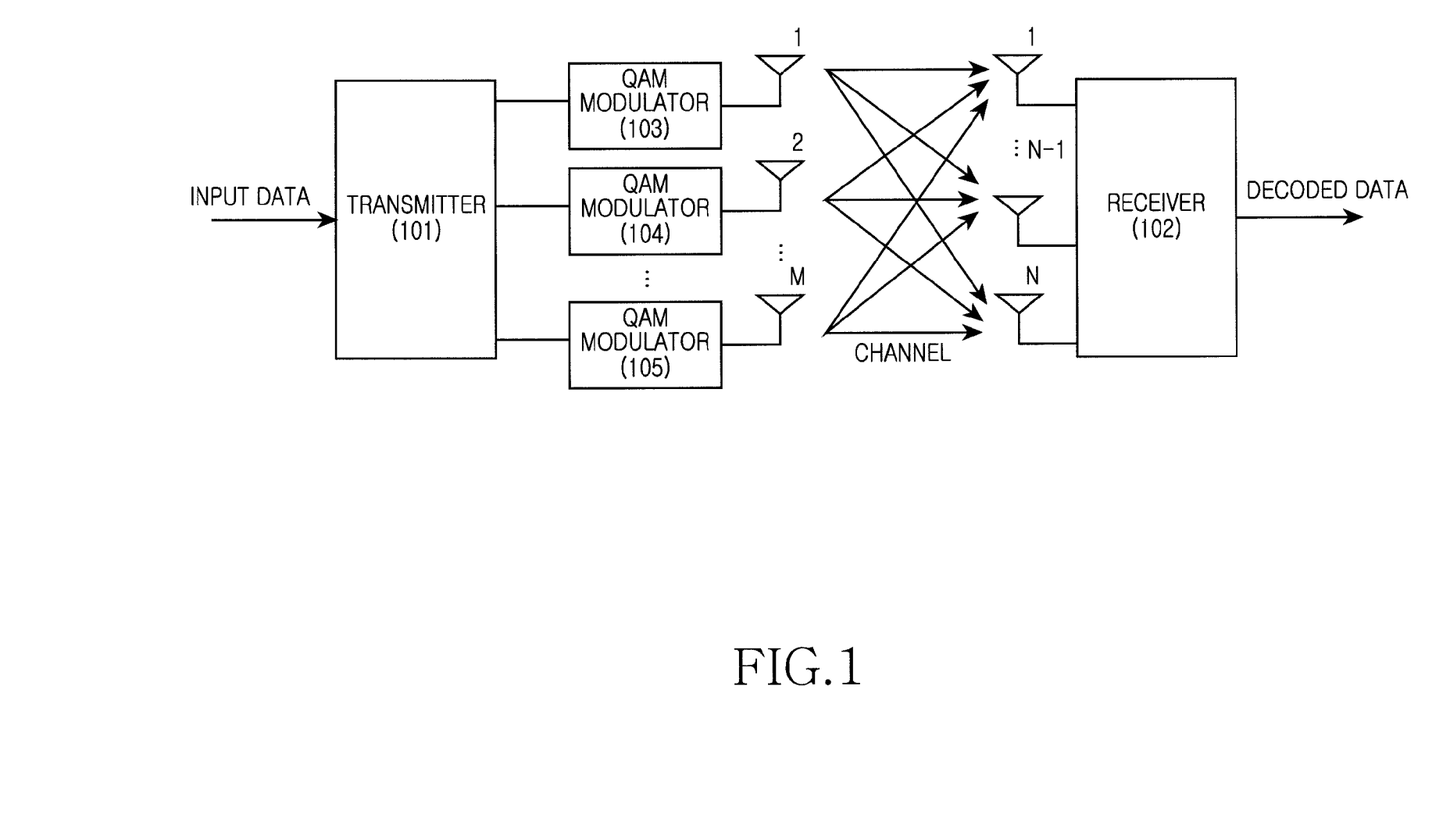
FIG. 1 illustrates a transmitting end and a receiving end in an wireless communication system according to an exemplary embodiment of the present invention.

FIG. 1 illustrates a transmitting end and a receiving end in a wireless communication system according to an exemplary embodiment of the present invention.

Referring to FIG. 1, a receiving/transmitting MIMO system is illustrated, with M transmitting and N receiving antennas and parallel receive/transmit of the set of layers of data.

Input data are processed in the transmitter 101, modulated in QAM modulators 103-105, and transmitted by M antennas through the channel. The transmitted signal undergoes distortions in the channel (distortions can be called by a multipath distribution, an additive noise, etc.), is received on N receiving antennas and is processed in the receiver 102. The receiver 102 includes synchronization modules, channel estimation modules, MIMO detection modules, decoding modules and other units needed for reception of the decoded data on a receiving end.

FIGS. 2A and 2B illustrate a Breadth-first search and a Depth-first search in a wireless communication system according to an exemplary embodiment of the present invention.

Referring to FIG. 2A, the "Breadth-first search" for 2 best branches (K=2) and modulation QPSK (Quadrature Phase Shift Keying) is illustrated. FIG. 2A describes a case that 2 best symbol candidates are selected in each layer.

The Search starts with a layer 4, where there are two best symbols-candidates with the minimum metrics (8), from which the search procedure passes to a layer 3. As represented using dotted-lines in FIG. 2A, two best symbols-candidates at modulation QPSK generate eight checked branches. Two best symbols-candidates, which, along with the best symbols-candidates from a layer 4, form the remaining branches with the minimum accumulated metrics according to Equation 7, are determined on layer 3. The best symbol candidates of layer 3 are used as starting points for search continuation on layer 2, and so forth. Thus, after selection of two best symbol candidates on a layer 1, two remaining branches are formed, including symbol candidates of all four layers, on which basis the soft or rigid decision on value of the transmitted vector is made. The described procedure assumes analysis of K*L branches on each layer. L denotes the dimension of the alphabet of the selected scheme of modulation and means total number of symbols that can be generated by the selected scheme of modulation. There are some methods, allowing reducing number of analyzed branches such as described in [1], [2], and [3]. The approaches, similar to those offered in [1], [2], [3], may be used at realization of MIMO detection.

FIG. 2B illustrates a scheme of "Depth-first search" for one best branch (K=1) and modulations QPSK (Quadrature Phase Shift Keying). FIG. 2B describes a case that 1 best symbol candidate is selected in each layer.

Referring to FIG. 2B, at the first stage the best symbol candidate with the minimum metrics (8) on a layer 4—symbol 2 is determined. Starting from the symbol 2, the search proceeds to layer 3, where the symbol 3 is scanned first. An order of scanning symbols belonging to the remaining branch is determined on the basis of preliminary sorting of symbols in each layer for each scanned branch. For example, the preliminary sorting may be performed as described in [1], [2] or [3]. In the shown example, accumulated metrics of a branch calculated according to Equation 7 corresponding to the symbol 3 is assumed to be less than a threshold value δ. Accordingly, the symbol 3 is received as the best symbol candidate and search proceeds to layer 2, where all possible symbols-candidates are scanned in order of priority, determined by preliminary sorting. At that time, any symbols in the layer 2 that does not enable extension of a current branch such that its accumulated metrics has appeared less than threshold value δ are excluded. As consequence, all branches beginning with a symbol 2 in layer 4 and containing symbol 3 in layer 3 are excluded from the subsequent search.

The search restarts from layer 4. Since the best symbol candidate for layer 4 is already detected, the search starts at symbol 2 in layer 4 and proceeds to layer 3. Here, symbol 2 follows symbol 3 in preliminary sorted list for layer 3 and the branch originating from symbol 2 in layer 4. Therefore, the symbol 2 is selected in the layer 3. The accumulated metrics of a branch corresponding to the symbol 2 are assumed to be less than threshold value δ. Accordingly, the symbol 2 is accepted as the best symbol candidate. The search proceeds to layer 2 and layer 1, in each of which the accumulated metrics, corresponding to the symbol 1, scanned first of all in layer 2 and layer 1, does not exceed threshold value δ. Thus, the remaining branch, which is used for the soft or rigid decision based on the value of the transmitted vector, is detected.

Figure 3:
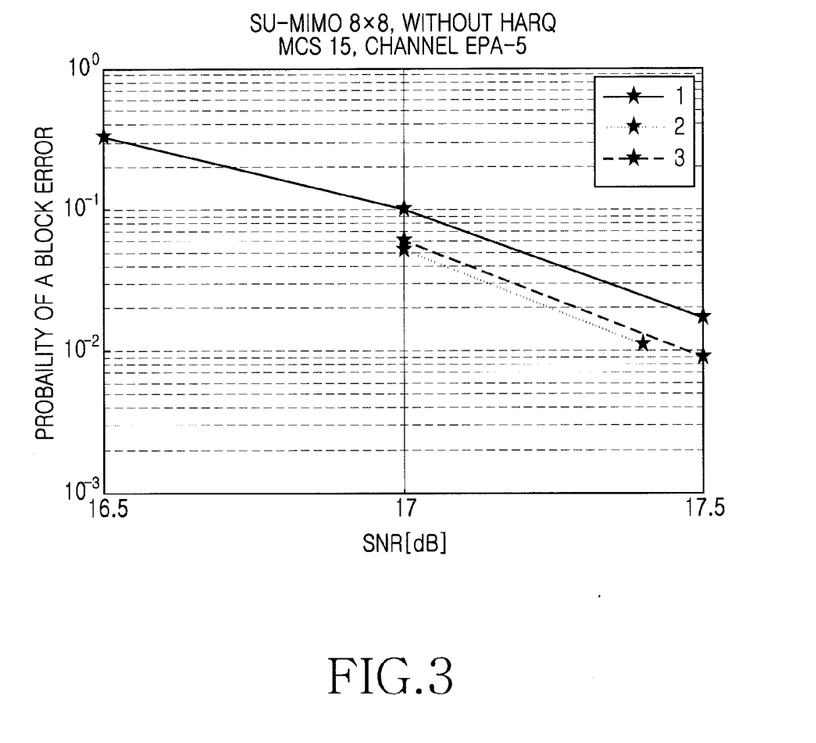
FIG. 3 illustrates a performance of an wireless communication system according to an exemplary embodiment of the present invention.

FIG. 3 illustrates a performance of a wireless communication system according to an exemplary embodiment of the present invention. FIG. 3 illustrates dependence of the block error probability on SNR for MIMO-OFDM 8×8 system (N=8, M=8, the system is compatible with the standard LTE Rel.10).

Referring to FIG. 3, the 4 iterative Max-Log-MAP Turbo decoder is used as the decoder, and for correcting errors. The modulation is QAM-16, the rate of encoding is ¾, and the channel is EPA-5 as described in [7]. Curves 1 and 2 correspond to a prototype described in [1] with a value of remaining branches/candidates K=40 and K=1000 accordingly. Row 3 corresponds to a method according to an exemplary embodiment of the present invention with a value of remaining branches/candidates K=40. The presented illustration shows advantage of the method according to exemplary embodiments of the present invention as compared to the prototype described in [1].

Figure 4:
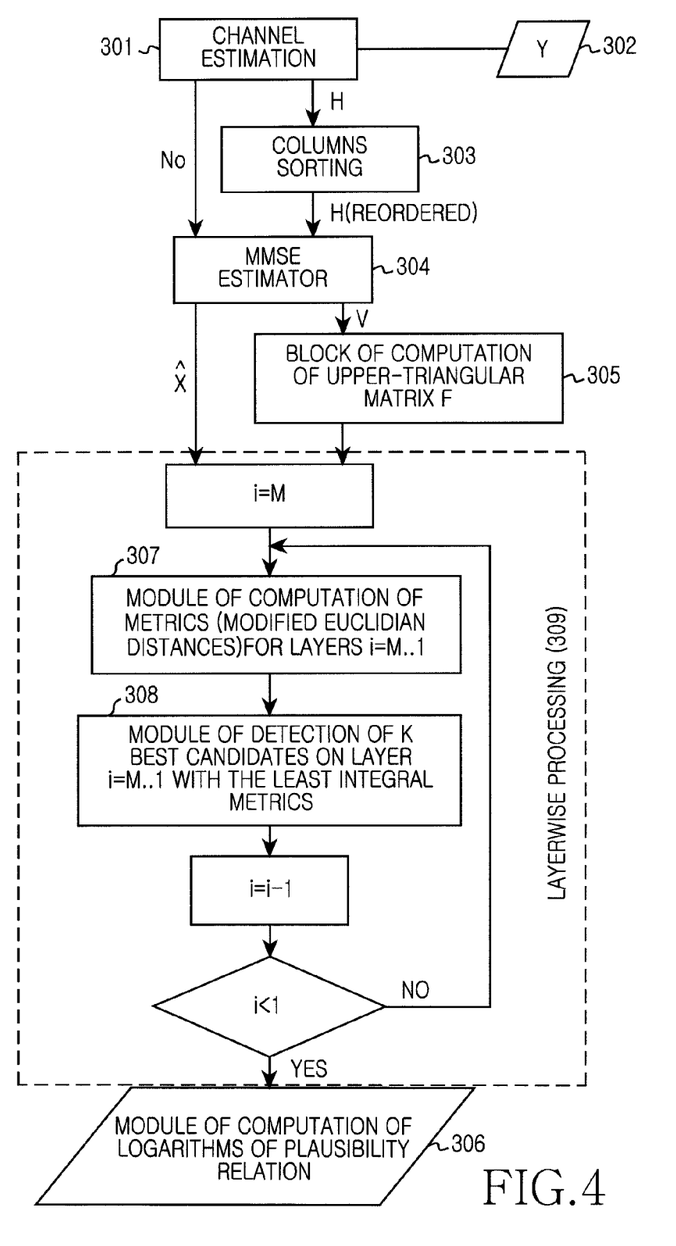
FIG. 4 illustrates a signal detecting method in a wireless communication system according to an exemplary embodiment of the present invention.

FIG. 4 illustrates a signal detecting method in a wireless communication system according to an exemplary embodiment of the present invention. FIG. 4 illustrates a block diagram explaining the claimed invention.

Referring to FIG. 4, the received signal Y 302 is directed to a channel estimation module 301 which forms an estimation of channel matrix H, and also an estimation of a dispersion of noise component $\sigma_\eta^2$. The estimation of a channel matrix is directed to the sorting module 303, which rearranges columns of channel matrix H according to their increasing number. The order of detection of layers in the transmitted vector may changes as a result.

Samples of the received signal together with values of the sorted channel matrix from the sorting module 303 are directed to the MMSE estimator 304. This module performs MMSE estimation of the transmitted vector $\hat{X}$ and estimation of the covariance matrix V.

The matrix V is directed to the triangular matrix computation module 305, which forms the upper-triangular matrix F according to procedure of layerwise estimation of marginal probabilities.

MMSE estimation $\hat{X}$ and the upper-triangular matrix F are directed to the layerwise processing module 309, in which, starting from the last layer (i=M), metrics for the most probable symbols-candidates are computed at block 307 for calculating metrics according to a procedure of determining modified Euclidean distance. The symbols, characterized by the minimum metrics, are retained at processing of each layer. Layerwise processing is continued with computation of the integrated metrics on each layer up to reaching the upper layer.

An estimation of probability for the transmitted symbols (transmitted bits) is formed in the computation module 306 that computes logarithms of ratios of plausibility based on metrics of the survived best candidates. The candidates are determined in the module 308.

According to exemplary embodiments of the present invention, the triangular matrix is formed on the basis of MMSE decision as follows:

At the first stage columns of a channel matrix are rearranged in ascending order of their norm for reception of an optimum allocation of layers during the MIMO detection. This rearranging process is also named as sorting of layers. As a result of sorting, the vector of MMSE decision $\hat{X}$ is received according to Equation 10:

$$\hat{X} = K_{MMSE} Y$$

$$V = I - K_{MMSE} H$$

$$K_{MMSE} = H^H (HH^H + 2\sigma_n^2 I)^{-1} \quad (10)$$

In Equation 10, $\hat{X}\hat{x}$ denotes a vector of MMSE estimations of dimension M×1, V denotes a covariance matrix of MMSE estimations of dimension M×M, $K_{MMSE}$ denotes MMSE matrix-filter of dimension N×M. H as used in Equation 10 differs from an initial matrix of the channel due to sorting of columns (e.g., by the sorting module 303)

The required vector is assumed to have Gaussian distribution with expectation value $\hat{X}$ and covariance matrix V.

Additional designations are used as follows:

$\rho_M$ denotes a lower diagonal element of matrix V;

$\overline{X}_{1,\ldots,M-k|M-k|1,\ldots,M}$ denotes a vector of expectation value for layers 1 . . . M-k of the conditional distribution of probability at specified lower layers M-k+1 . . . M, dimension of a vector (M-k)×1;

$V^{(m\ k)}$ denotes a covariance matrix characterizing the conditional distribution of probability of layers 1 . . . M-k at specified lower layers M-k+1 . . . M, dimension of matrix (M-k)×(M-k);

$\rho_{(M-k)}$ denotes lower diagonal element of matrix $V^{(M-k)}$.

A representation of covariance matrix V may have a form of a set of four components as seen in Equation 11:

$$V = \begin{bmatrix} V_{(1\ldots M-1)} & V_{(1\ldots M-1),M} \\ V_{(1\ldots M-1),M}^H & \rho_M \end{bmatrix} \quad (11)$$

In Equation 11, $V_{1\ldots M-1}$ denotes an initial matrix without the last row and column, $V_{(1\ldots M-1),M}$ denotes the last column without the lower element, $V_{(1\ldots M-1),M}^H$ denotes the last row without the right element, and $\rho_M$ denotes a lower diagonal element.

Generation of a triangular matrix is described by the following sequence of steps for layers from layer M up to layer 1.

Step 1. For layer M, the expectation value and a dispersion coincide with MMSE estimation. For example, the expectation value and the dispersion may be determined according to Equation 12:

$$\overline{X}_M = \hat{X}_M; \rho_M = V_{M,M} \quad (12)$$

Step 2. For layers 1 to M-1, parameters of the conditional distribution of probabilities are determined according to the decision on layer M. The expectation value for layers 1 . . . M-1 may be determined by Equation 13:

$$\overline{X}_{1\ldots M-1|M} = \hat{X}_{1\ldots M-1} + V_{(1\ldots M-1),M} \rho_M^{-1} (X_M - \overline{X}_M) \quad (13),$$

In Equation 13, $X_M$ denotes one possible symbol of constellation on layer M, determined by type of modulation. The covariance matrix for layers 1 to M-1 may be set by Equation 14:

$$V^{(M-1)} = V_{(1\ldots M-1)} - V_{(1\ldots M-1),M} V_{(1\ldots M-1),M}^H \rho_M^{-1} \quad (14)$$

For layer M-1, it is possible to set the marginal distribution of probability depending on a symbol on layer M, wherein expectation value $\overline{X}_{M-1|M}$ and dispersion $\rho_{M-1|M}$ of such distribution will be equal (M-1)-th component of vector $\overline{X}_{1\ldots M-1|M}$ and to last diagonal element of matrix $V^{(M-1)}$, that is, $\rho_{M-1|M} = V_{M-1,M-1}^{(M-1)}$.

Step 3. For layers 1 to M-2, an expectation value and a covariance matrix is determined as Equations 15 and 16:

$$\overline{X}_{1\ldots M-2|M-1,M} = \overline{X}_{1\ldots M-2|M} + V_{(1\ldots M-2),M-1}^{(M-1)} \rho_{M-1|M}^{-1} (X_{M-1} - \overline{X}_{M-1|M}) \quad (15)$$

$$V^{(M-2)} = V_{(1\ldots M-2)}^{(M-1)} - V_{(1\ldots M-2),M-1}^{(M-1)} (V_{(1\ldots M-2),M-1}^{(M-1)})^H \rho_{M-1|M}^{-1} \quad (16)$$

Naturally marginal dispersion $\rho_{M-2|M-1,M}$ and expectation value $\overline{X}_{M-2|M-1,M}$ for layer M-2 are set by (M-2) element of vector $\overline{X}_{1\ldots M-2|M-1,M}$ and last diagonal element of matrix $V^{(M-2)}$.

Step M. For layer 1, an expectation value and a covariance matrix is determined as Equations 17 and 18:

$$\overline{X}_{1|2\ldots M-1,M} = \overline{X}_{1|3\ldots M-1,M} + V_{(1),2}^{(2)} \rho_{2|3\ldots M-1,M}^{-1} (X_2 - \overline{X}_{2|3\ldots,M-1,M}) \quad (17)$$

$$\rho_{1|2\ldots M-1,M} = V^{(1)} = V_{(1)}^{(2)} - V_{(1),2}^{(2)} (V_{(1),2}^{(2)})^H \rho_{2|3\ldots M-1,M}^{-1} \quad (18)$$

From the equations above it follows that the expectation value and a dispersion of the conditional distribution of probability of a layer k depend only on elements of covariance matrix of MMSE decision V, from values of symbols of constellation $X_{k+1,k+2,\ldots,M}$ (i.e. symbols-candidates on layers k+1 . . . M), and elements of vector of MMSE decision $\hat{X}_{k,k+1,\ldots,M}$.

A probability of transmission of the whole vector $X = (x_1, x_2, \ldots, x_{M-1}, x_M)^T$ equals a product of probabilities for each symbol, as seen in Equation 19:

$$p(x_1, x_2, \ldots x_{M-1}, x_M) = p(x_1 | x_2, \ldots x_{M-1}, x_M) \cdot p(x_2 | x_3, \ldots x_{M-1}, x_M) \ldots p(x_{M-1} | x_M) p(x_M) \quad (19)$$

Each factor in Equation 19 is a Gaussian exponent determined by Equations 12 to 18. Accordingly, the probability for a full vector may be described by Equation 20.

$$p(x_1, x_2, \ldots, x_{M-1}, x_M) = C \exp\left(-\left(\frac{\|X_M - \overline{X}_M\|^2}{\rho_M} + \frac{\|X_{M-1} - \overline{X}_{M-1|M}\|^2}{\rho_{M-1|M}} + \ldots + \frac{\|X_1 - \overline{X}_{1|2,\ldots,M-1,M}\|^2}{\rho_{1|M}}\right)\right)$$

$$= C \exp\left(-\sum_{k=1}^{M} \frac{1}{\rho_k} \left\|\sum_{i=k+1}^{M} f_{ki} \hat{x}_i - \sum_{i=k+1}^{M} f_{ki} x_i\right\|^2\right) \quad (20)$$

In Equation 20, $\hat{x}_i$ denotes a component of a vector of MMSE decision $\hat{X}$ on a layer i, $x_i$ denotes a symbol candidate from the constellation determined by a type of modulation, C denotes a normalizing constant, and $f_{k,i}$ denotes an element of a triangular matrix. The index i indicates that the given symbol candidate is selected for layer i.

This method of generation of triangular matrix may be referred to as a "procedure of layerwise estimation of marginal probabilities".

Equation 20 may be rewritten as Equation 21:

$$p(x_1, x_2, \ldots x_{M-1}, x_M) = C \exp(-(F\hat{X} - FX)^H \mathfrak{R}^{-1} (F\hat{X} - FX)) \quad (21)$$

In Equation 21, F denotes an upper-triangular matrix, and $\mathfrak{R}$ denotes a diagonal matrix with values $\rho_k$ on a diagonal.

When an upper-triangular matrix $\tilde{F}=\sqrt{\mathfrak{R}}\ F$, then Equation 20 may be converted to Equation 22:

$$p(x_1, x_2, \ldots, x_{M-1}, x_M) = C\exp(-\|(\tilde{F}\hat{X}-\tilde{F}X)\|^2) \quad (22)$$

It is easy to see that the probability of an incomplete vector (only for layers k to M) may be determined similar to Equation 23:

$$p(x_k, x_{k+1}, \ldots, x_M) = C\exp(-\|(\tilde{F}_{k\ldots M}\hat{X}_{k\ldots M} - \tilde{F}_{k\ldots M} X_{k\ldots M})\|^2) \quad (23)$$

In Equation 23, $\tilde{F}_{k\ldots M}$ denotes an upper-triangular matrix formed by lower k-M rows and k-M columns of matrix $\tilde{F}$.

From here it is apparatus that a search process for candidates may be made layerwise similarly to K-best, and candidates on a layer k are selected from a condition of minimization of metrics $\|(\tilde{F}_{k\ldots M}\hat{X}_{k\ldots M} - \tilde{F}_{k\ldots M} X_{k\ldots M})\|^2$.

Probabilities represented by Equations 21 and 22 are received on the basis of MMSE decision which gives the shifted estimation of vector $\hat{X}$ relatively its true value. For a presence of true function of the plausibility, determining probability of a symbol, the distribution of probability, set by MMSE decision, may be presented in the form of product of probabilities in Equation 24:

$$p_{MMSE}(x_k, x_{k+1}, \ldots, x_M) = \Lambda(Y|x_k, x_{k+1}, \ldots x_M) P_{Pr}(x_k, x_{k+1}, \ldots, x_M) \quad (24)$$

In Equation 24, $\Lambda(Y|x_k, x_{k+1}, \ldots x_M)$ denotes a true function of plausibility based on measurements (i.e. without the a priori information on received symbols), and $P_{Pr}(x_k, x_{k+1}, \ldots, x_M)$ denotes a priori information on symbols.

MMSE decision supposes Gaussian approximation of target signal with zero expectation value and unit dispersion. Accordingly, the true function of plausibility and the priori information may be expressed as Equation 25:

$$P_{Pr}(x_k, x_{k+1}, \ldots, x_M) = P_{Pr}(x_k) P_{Pr}(x_{k+1}) \ldots P_{Pr}(x_M) = \exp(-\|x_k\|^2 - \|x_{k+1}\|^2 - \ldots - \|x_M\|^2)$$

$$\Lambda(Y|x_k, x_{k+1}, \ldots x_M) = C\exp(-\|(\tilde{F}_{k\ldots M}\hat{X}_{k\ldots M} - \tilde{F}_{k\ldots M} X_{k\ldots M})\|^2 + \|x_{k+1}\|^2 + \ldots + \|x_M\|^2) \quad (25)$$

For finding the best candidate on a layer k, the symbol of constellation giving the minimum metrics may be searched for according to Equation 26:

$$\|(\tilde{F}_{k\ldots M}\hat{X}_{k\ldots M} - \tilde{F}_{k\ldots M} X_{k\ldots M})\|^2 - \|x_{k+1}\|^2 + \ldots + \|x_M\|^2 \quad (26)$$

The metrics of Equation 26 may be referred to as "modified Euclidian distance". After processing of all layers, a true function of plausibility for a full vector of the transmitted symbols may be defined by Equation 27:

$$\Lambda(Y|Y) = C\exp(-\|(\tilde{F}\hat{X}-\tilde{F}x)\|^2 + \|x_1\|^2 + \|x_2\|^2 + \ldots + \|x_M\|^2) \quad (27)$$

As an example, a computation of elements of triangular matrix F for MIMO system 3×3 is presented below with respect to Equations 28-31.

Assume the MMSE decision gives an initial covariance matrix:

$$V = \begin{bmatrix} v_{11} & v_{12} & v_{13} \\ v_{21} & v_{22} & v_{23} \\ v_{31} & v_{32} & v_{33} \end{bmatrix} \quad (28)$$

Then, for layer 3:

$$\rho_4 = v_{33}$$

$$f_{33} = 1; \quad (29)$$

For layer 2:

$$\rho_{2|3} = v_{22} - \frac{v_{23} v_{32}}{v_{33}} \quad (30)$$

$$f_{22} = 1$$

$$f_{23} = \frac{v_{23}}{v_{33}}$$

For layer 1:

$$\rho_{1|23} = v_{11} - \frac{v_{13} v_{31}}{v_{33}} - \frac{(v_{12} v_{33} - v_{13} v_{32})(v_{21} v_{33} - v_{23} v_{31})}{v_{33}(v_{22} v_{33} - v_{23} v_{32})} \quad (31)$$

$$f_{11} = 1$$

$$f_{12} = \frac{v_{12} v_{33} - v_{13} v_{32}}{v_{22} v_{33} - v_{23} v_{32}}$$

$$f_{13} = \frac{v_{13}}{v_{33}} - \frac{(v_{12} v_{33} - v_{13} v_{32}) v_{23}}{(v_{22} v_{33} - v_{23} v_{32}) v_{33}}$$

These decisions simplify a search procedure of the best candidates on a layer. In [3], in procedure K-best based on QR decomposition, the candidates having the best metrics according to hierarchy, based on the decision for a current layer, are determined. For a layer k according to Equation 7, a "soft" symbol is computed according to Equation 32:

$$\tilde{x}_k = \frac{1}{r_{kk}}(z_k - r_{k(k+1)} x_{k+1} - \ldots r_{kM} x_M) \quad (32)$$

Wherein metrics of candidates on a layer are analyzed according to the order set by value $\tilde{x}_k$. For this purpose values $\tilde{x}_k$ are approximated (for example, the rounding can be done so that to determine the point of constellation nearest to $\tilde{x}_k$) and metrics of candidates are analyzed according to the order set by the table, the input to which is an approximated value $\tilde{x}_k$. Such approach is correct as in procedure K-best, based on QR decomposition, as appears from Equation 7 selection of the best candidates on a layer is entirely determined by value $\tilde{x}_k$.

However, according to exemplary embodiments of the present invention this is not the case, because, as is apparent from Equation 25, the metrics are determined also by energy of symbol candidate $\|x_k\|^2$. Nevertheless, a procedure of the simplified search of a symbol candidate may be applied in a method according to exemplary embodiments of the present invention. For this purpose the decision is found on a layer k according to Equation 33.

$$\bar{x}_k = \frac{1}{\tilde{f}_{kk}} \begin{pmatrix} \tilde{F}_{k,k\ldots M} \hat{X}_{k\ldots M} - \\ \tilde{F}_{k,k+1\ldots M} X_{k+1\ldots M} - \\ \|x_{k+1}\|^2 - \ldots - \|x_M\|^2 \end{pmatrix} \quad (33)$$

In Equation 33, $\tilde{F}_{k,k\ldots M}$ denotes row k of triangular matrix $\tilde{F}$, in which elements with indexes k . . . M are used, $\hat{X}_{k\ldots M}$ denotes a lower part of vector $\hat{X}$, in which elements with indexes k=1 . . . M are used, $\tilde{F}_{k,k+1\ldots M}$ denotes a row k of triangular matrix $\tilde{F}$, in which elements with indexes k+1 to M are used, and $X_{k+1\ldots M}$ denotes a vector of symbols-candidates for layers k+1 to M (layers determined on the previous steps).

A search of the best candidates may be carried out according to a hierarchy set by the approximated value $\check{x}_k$.

As seen from Equation 33, energy of a symbol at determination of hierarchy of symbols-candidates on a current layer is neglected that may lead to some degradation in algorithm operation. However, as modeling shows, this degradation does not exceed several tenth decibels. In addition, the approximate value of Equation 33 is used only for determination of hierarchy of symbol candidates (i.e. at determination of order, in which the best metrics are investigated). At the same time the more precise Equation 26, considering energy of a symbol on a current layer, is still used at the computation of the metrics themselves.

In the example shown above the variant of layerwise search, which is also named "Breadth-first search", was considered. Nevertheless, an approach according to an exemplary embodiment of the present invention may be applied to Depth-first search. In this method the metrics of Equation 26 on the layer k is compared to threshold value and, if the value of the metrics is less than the threshold, the search with the given set of candidates is continued for layer k−1. Otherwise the given branch of search is stopped, and the search is restarted from layer k+1.

In aforementioned exemplary embodiments of the present invention, the upper-triangular matrix $\tilde{F}$ is used. According to another exemplary embodiment of the present invention, the upper-triangular matrix $\tilde{F}$ may be converted in a lower-triangular matrix. In this case search of symbol candidates will be performed, starting from the first layer in a direction of the last layer. Preliminary sorting of columns of matrix H should be performed in decreasing order of metrics for each column.

Preliminary sorting of columns of matrix H sets order of layers, in which search of symbols-candidates is performed. Other methods of sorting are also available, giving similar results. For example, it is possible to sort layers according to magnitudes of diagonal elements of covariance matrix of MMSE decisions V. In addition, search by layers may be performed in ascending order of magnitudes of corresponding elements.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

The method according to exemplary embodiments of the present invention possesses low computing complexity and, thereby, may be realized in base stations, femto—and pico—cells, as well as in user terminals and other elements of receiving/transmitting systems and networks using MIMO technology.

Thus, a method of the level-by-level search, based on an estimation of a vector of the transmitted signal by criterion of a minimum mean square error (MMSE—minimum mean square error), according to exemplary embodiments of the present invention, possesses the best operating characteristics and similar or smaller complexity of realization, as opposed to the prototype described in [1].

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for detecting signals in a receiving end having a plurality of antennas in wireless communication system, the method comprising:
   performing Minimum Mean Square Error (MMSE) estimation for a transmitted symbol vector;
   determining a covariance matrix for the MMSE estimation;
   determining a triangular matrix based on the covariance matrix;
   determining accumulated metrics for each of at least one symbol vector candidate based on the triangular matrix; and
   detecting symbols transmitted in the signals according to the accumulated metrics.

2. The method of claim 1, wherein the triangular matrix is determined according to a procedure of layerwise estimation of marginal probabilities.

3. The method of claim 1, wherein the metrics comprise a sum of total distance computed for all previous layers and a distance to a symbol candidate of a current layer.

4. The method of claim 3, wherein the metrics are determined according to $$\|(\tilde{F}_{k\ldots M}\hat{X}_{k\ldots M} - \tilde{F}_{k\ldots M}X_{k\ldots M})\|^2 - \|x_k\|^2 - \|x_{k+1}\|^2 - \ldots - \|x_M\|^2,$$

where $\tilde{F}_{k\ldots M}$ denotes a lower-diagonal part of a matrix $\tilde{F}$ of the size (M−k+1)×(M−k+1), $\hat{X}_{k\ldots M}$ denotes a lower part of a vector of MMSE decision of the size (M−k+1)×1, $X_{k\ldots M}$ denotes a lower part of a vector of a symbol candidate of the size (M−k+1)×1, and $\|x_k\|^2, |x_{k+1}\|^2, \ldots, |x_M\|^2$ denote metrics characterizing energy of components of a symbol candidate for layers k to M.

5. The method of claim 1, further comprising:
   estimating a probability of the transmitted symbols based on the metrics.

6. The method of claim 1, further comprising:
   estimating a channel matrix; and
   reordering columns of the channel matrix according to an energy of the received signals.

7. The method of claim 1, wherein the determining of the metrics comprises:
   selecting best symbol candidates in each layer.

8. The method of claim 7, wherein, the selecting of the best symbol candidates in each layers comprises determining an order for search based on a value of a soft symbol that is determined based on the triangular matrix.

9. The method of claim 8, wherein the value of the soft symbol is determined according to $$\bar{x}_k = \frac{1}{\tilde{f}_{kk}} \begin{pmatrix} \tilde{F}_{k,k\ldots M} \hat{X}_{k\ldots M} - \\ \tilde{F}_{k,k+1\ldots M} \hat{X}_{k+1\ldots M} - \\ \|x_{k+1}\|^2 - \ldots - |x_M|^2 \end{pmatrix}$$

where $\tilde{F}_{k,k\ldots M}$ denotes a line k of triangular matrix $\tilde{F}$, in which elements with indexes k ... M are used, $\hat{X}_{k\ldots M}$ denotes a lower part of vector $\hat{X}$, in which elements with indexes k=1 ... M are used, $\tilde{F}_{k,k+1\ldots M}$ denotes a row k of the triangular matrix $\tilde{F}$, in which elements with indexes k+1 ... M are used, and $X_{k+1\ldots M}$ denotes a vector of symbol candidates for layers k+1 to M.

10. The method of claim 1, wherein the symbol vector candidates are determined by searching symbol candidates by one of a breadth-first-search and depth-first-search.

11. An apparatus for a receiving end having a plurality of antennas in wireless communication system, the apparatus comprising:
the plurality of antennas for receiving signals comprising transmitted symbol vector from a transmitting end; and
a receiver for performing Minimum Mean Square Error (MMSE) estimation for the transmitted symbol vector, for determining a covariance matrix for the MMSE estimation, for determining a triangular matrix based on the covariance matrix, and for determining accumulated metrics for each of at least one symbol vector candidate based on the triangular matrix.

12. The apparatus of claim 11, wherein the triangular matrix is determined according to a procedure of layerwise estimation of marginal probabilities.

13. The apparatus of claim 11, wherein the metrics comprise a sum of total distance computed for all previous layers and a distance to a symbol candidate of a current layer.

14. The apparatus of claim 13, wherein the metrics are determined according to, $$\|(\tilde{F}_{k\ldots M}\hat{X}_{k\ldots M} - \tilde{F}_{k\ldots M}X_{k\ldots M})\|^2 - \|x_k\|^2 - \|x_{k+1}\|^2 - \ldots - |x_M|^2,$$

where $\tilde{F}_{k\ldots M}$ denotes a lower-diagonal part of matrix $\tilde{F}$ of the size (M−k+1)×(M−k+1), $\hat{X}_{k\ldots M}$ denotes a lower part of a vector of MMSE decision of the size (M−k+1)×1, $X_{k\ldots M}$ denotes a lower part of a vector of a symbol candidate of the size (M−k+1)×1, and $\|x_k\|^2, |x_{k+1}|^2, \ldots, |x_M|^2$ denotes metrics characterizing energy of components of a symbol candidate for layers k to M.

15. The apparatus of claim 11, wherein the receiver is further configured to estimate probability of the transmitted symbols based on the metrics.

16. The apparatus of claim 11, wherein the receiver is further configured to estimate a channel matrix, and reorder columns of the channel matrix according to energy of received signals.

17. The apparatus of claim 11, wherein the receiver is configured to select best symbol candidates in each of the layers.

18. The apparatus of claim 17, wherein, when selecting the best symbol candidates in each layer, an order for search is determined based on a value of a soft symbol that is determined based on the triangular matrix.

19. The apparatus of claim 18, wherein the value of the soft symbol is determined according to $$\bar{x}_k = \frac{1}{\tilde{f}_{kk}} \begin{pmatrix} \tilde{F}_{k,k\ldots M} \hat{X}_{k\ldots M} - \\ \tilde{F}_{k,k+1\ldots M} \hat{X}_{k+1\ldots M} - \\ \|x_{k+1}\|^2 - \ldots - |x_M|^2 \end{pmatrix}$$

where $\tilde{F}_{k,k\ldots M}$ denotes a line k of a triangular matrix $\tilde{F}$, in which elements with indexes k ... M are used, $\hat{X}_{k\ldots M}$ denotes a lower part of a vector $\hat{X}$, in which elements with indexes k=1 ... M are used, $\tilde{F}_{k,k+1\ldots M}$ denotes a row k of the triangular matrix $\tilde{F}$, in which elements with indexes k+1 ... M are used, and $X_{k+1\ldots M}$ denotes a vector of symbol candidates for layers k+1 to M.

20. The apparatus of claim 11, wherein the symbol vector candidates are determined by searching symbol candidates by one of breadth-first-search and depth-first-search.

* * * * *